Feb. 2, 1960 J. G. LANGDON 2,923,919

REMOTE CONTROL CIRCUIT

Filed June 29, 1953 2 Sheets-Sheet 1

INVENTOR:
John G. Langdon

By Herbert E. Metcalf
His Patent Attorneys

INVENTOR:
John G. Langdon
By Herbert E. Metcalf
His Patent Attorneys

United States Patent Office 2,923,919

Patented Feb. 2, 1960

2,923,919

REMOTE CONTROL CIRCUIT

John G. Langdon, Hawthorne, Calif., assignor to Northrop Corporation, Hawthorne, Calif., a corporation of California Application June 29, 1953, Serial No. 364,808

4 Claims. (Cl. 340—172)

This invention relates to remote control circuits, and more particularly, to a non-dialing type remote control circuit for stepping relays or similar components.

Practically all operational procedures are controlled by an "on-off" type proposition. Consequently uses of "on-off" type control circuits are manifold. Often it is desirable to provide centralized, remote control for a large number of "on-off" type propositions e.g. the receivers and/or transmitters of a communications control station. Of course, there are innumerable other applications of remote "on-off" type control, ranging, as an example, from channel selection in a television receiver to coding an electronic computer. Previously, two principal methods have been utilized for effecting "on-off" type control:

(1) By means of selector switches. (These switches require a lead for each proposition and also a common ground.)

(2) By means of a dial system which requires but one lead and a ground connection; this method manifests the disadvantage of requiring an index of operations in accordance with the number of propositions being controlled.

It is accordingly, a fundamental object of this invention to provide means of remote control for a plurality of propositions and/or operations by means of suitable selector switches which utilize but three wires, including ground, to connect controlled devices to a central control station.

In order to accomplish the foregoing object and resulting associated objects, the invention utilizes a thyratron type control tube which is normally cut off, and which is provided with an A.C. plate supply voltage. At a remote station, when a switch corresponding to a particular operation is closed, a corresponding unique D.C. voltage is effected on the grid of the thyratron, this voltage being of magnitude sufficient to fire the tube on each positive excursion of the plate supply voltage; consequent actuation of a cathode voltage adjusting device eventually restores tube cut off, where the grid-cathode potential is insufficient to re-fire the tube after the negative excursions of the plate supply voltage have stopped conduction. A stepping relay is suitably connected to be energized as a result of alternating current flow in the plate circuit of the thyratron so that when the tube fires, a stepper arm moves to the cut off effecting position and consequently the arm stops when the proper bias voltage is reacted. It is to be noted that a control switch must be closed until the stepper arm motion tending to cut off the tube is completed; otherwise the arm will cease motion before attaining a desired position and the consequent switching operation will be incomplete.

In an alternate embodiment of the invention, actuation of a particular switch can be used to impress a corresponding voltage on the cathode of the thyratron, this voltage being of magnitude sufficient to effect firing of the thyratron; consequent actuation of a grid voltage adjusting device will then restore cut off conditions.

The invention is based on the principle of control via incremental changes in grid-cathode potential of a control tube; such incremental potential changes can be effected by connecting either series or shunt resistors to either the upper or lower portion of each of two bleeder bias circuits forming voltage dividers which have a predetermined intermediate point thereof connected respectively to the grid and cathode, and by providing connecting means to the central control station for either the grid or cathode circuit and/or by using a positive instead of a negative voltage for the bleeder circuits. Of course, the magnitudes of voltages used for bias supply, for plate supply and for relay supply are arbitrary, maximum values being limited primarily by insulation problems and more particularly by tube ratings. It is to be noted that the invention is not limited to gas-filled tubes as "hard" type vacuum tubes will also suffice.

The minimum range of potential values of the bias supply must be such as to provide a sufficient number of increments for control operation. For example, a circuit of the type herein disclosed can readily be expanded to accommodate as many as 60 switching operations by proper choice of components. Generally speaking, the range of voltage of the bias supply is equal to the voltage increment times $(n+2)$ where $n$ is the number of switching operations to be controlled.

Further objects, features and advantages manifested by this invention will become apparent from a consideration of the following description in conjunction with the accompanying drawings in which.

*Explanation of fundamental circuit*

Figures 1, 3:
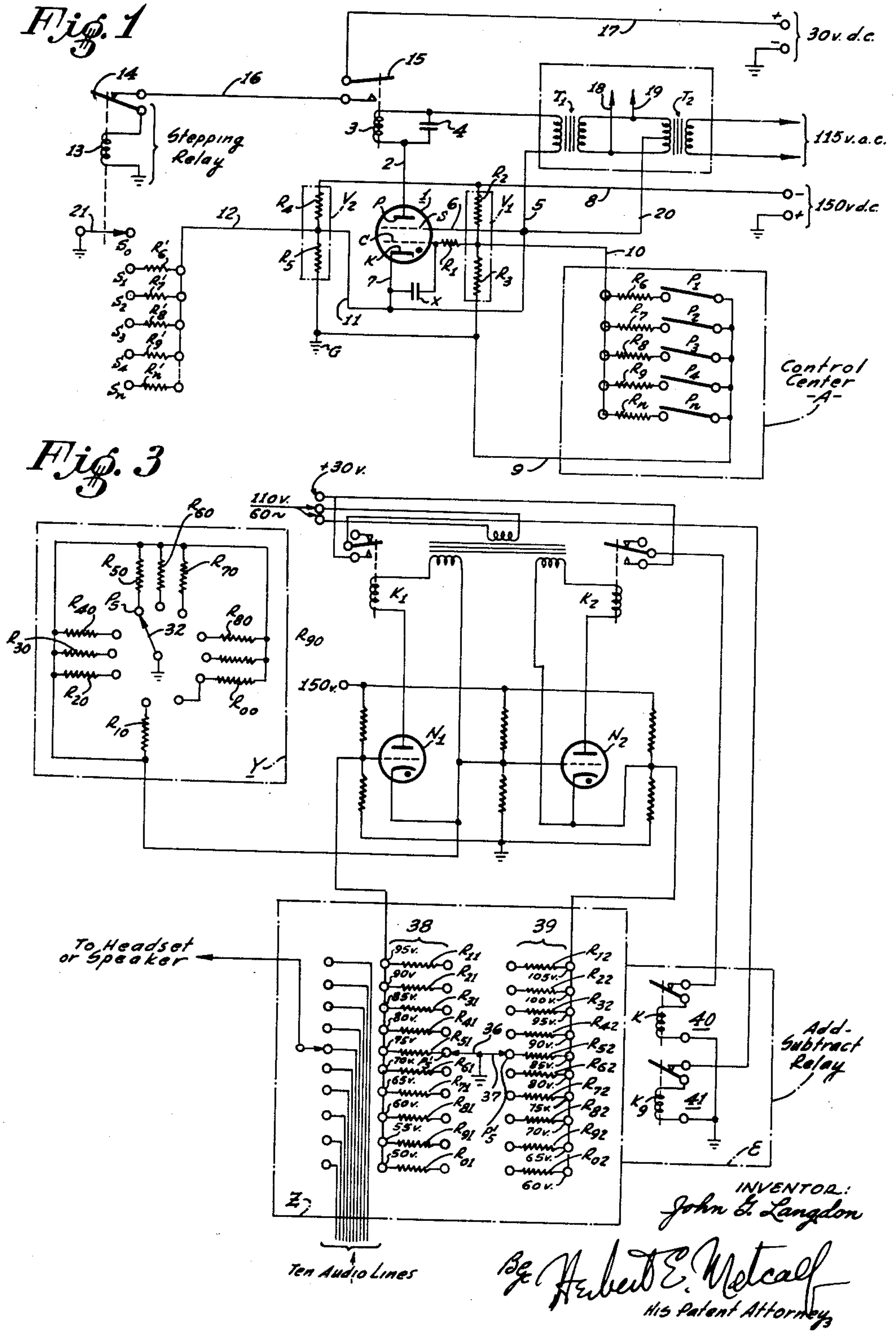
Figure 1 is a schematic diagram exemplifying the fundamental circuit of this invention.
Figure 3 is a schematic diagram of an alternate embodiment of the invention useful in selecting one control proposition from a plurality of such propositions.

With reference to Figure 1, the operation of a remote control circuit using a thyratron to control a stepping relay will now be explained. Thyratron 1—an RCA type 2D21, for example, includes screen grid $s$ and control grid $c$. It is to be noted that, in a thyratron, the action of control grid $c$ differs from that of a control grid in a high-vacuum tube inasmuch as, after the initiation of a discharge, the presence of control grid $c$ and its potential are immaterial. Consequently after breakdown, control grid $c$ acts merely as an isolated probe immersed in the plasma within the thyratron; thus control grid $c$ has but a secondary effect on the anode current. However, the anode potential at which the thyratron breaks down may be accurately controlled by the potential of control grid $c$. Consequently a large amount of power in the anode circuit may be controlled by a very small amount of power in the grid circuit.

The purpose of screen grid $s$ is to increase the alternating-current input impedance and to decrease the reaction of plate $p$ on control grid $c$.

Plate $p$ is connected via lead 2 to relay coil 3 and to shunting capacitor 4 which are connected, in parallel, to isolation transformer $T_1$ whose alternating-current output is connected to cathode $k$ via leads 5 and 7. Cathode $k$ is further connected to screen grid $s$ via leads 7, 5 and 6, and to center-tap lead 20 from transformer $T_2$. A small magnitude capacitor $x$ connecting cathode $k$ with control grid $c$ is necessary in order to prevent random firing of thyratron 1. The purpose of grid-limiting resistor $R_1$ is to prevent excessive grid current and to maintain relatively constant voltage division across voltage divider $V_1$ which is comprised of series resistors $R_2$ and $R_3$ which are connected to a direct-current voltage source (—150 volts, for example), via lead 8 and to parallel resistors $R_6$ through $R_n$ in control center A via lead 9 and via grid connection 10. Voltage divider $V_1$ and voltage divider $V_2$ are both grounded at G, taken at some convenient location on the chassis, for example. Voltage divider $V_2$ comprised of resistors $R_4$ and $R_5$ is connected to cathode *k* via leads 11 and 7 and to stepper contacts $S_1$ through $S_n$, via lead 12 and parallel resistors $R_6'$ through $R_n'$, respectively. Stepping relay coil 13 is connected via switches 14 and 15 and leads 16 and 17 to a voltage source (+30 volts, for example). Transformer $T_2$ supplies heater voltage via leads 18 and 19 (6.3 volts, for example).

Voltages maintained by voltage divider $V_1$ across control grid *c* and by voltage divider $V_2$ across cathode *k* are determined by magnitudes of resistors $R_2$ and $R_3$ and by resistors $R_4$ and $R_5$, respectively; magnitudes of these resistors are selected so as to maintain cut-off conditions (—90 volts on cathode *k* and —95 volts on grid *c*, for example) when selector switches $P_1$ through $P_n$ are open and stepper switch 21 is at contact $S_0$. Plate *p* of thyratron 1 is supplied with alternating-current (115 volts, for example) from isolation transformer $T_1$.

When it is desired to select a particular line or to operate a remote device, an appropriate selector switch is closed at control center A. It is to be noted that selector switches $P_1$ through $P_n$ may be spring loaded toggle switches, push button switches, rotary type selector switches or any desired combination of the foregoing by utilization of suitable supplementary circuits.

In order to exemplify operational principles, assume selector switch $P_2$ is closed at control center A. As a result, voltage on control grid *c* is increased because of the shunting effect of resistor $R_7$ which is of sufficient magnitude to increase voltage on control grid *c* (from —95 volts to —85 volts, for example). The voltage on cathode *k* remains unaltered (—90 volts); consequently thyratron 1 fires because control grid *c* is now positive with respect to cathode *k*. Conduction of thyratron 1 effects a drop in voltage on lead 2 and a corresponding current flow through relay coil 3, closing switch 15 and thus energizing stepping relay coil 13, causing stepper arm 21 to progress from contact $S_0$ to contact $S_2$ which, by virtue of the magnitude of resistor $R_7'$, effectively increases cathode voltage to —80 volts, for example, and thus cuts off thyratron 1 since cathode *k* is now positive with respect to control grid *c*. Therefore, it is seen that the ultimate position of stepper arm 21 is remotely controlled at control center A in accordance with which one of selector switches $P_1$ through $P_n$, controlling stepper contacts $S_1$ through $S_n$, respectively, is operated.

It is to be noted that the fundamental circuit as shown in Figure 1 does not provide for resetting of stepper arm 21 in order to prepare for the next selection. This stepping action is accomplished by means of auxiliary circuitry to be discussed later.

*Application of fundamental circuit*

Having discussed the operation of a fundamental circuit, the application of an alternate embodiment of this circuit in a typical communications control system will now be considered.

Figure 2:
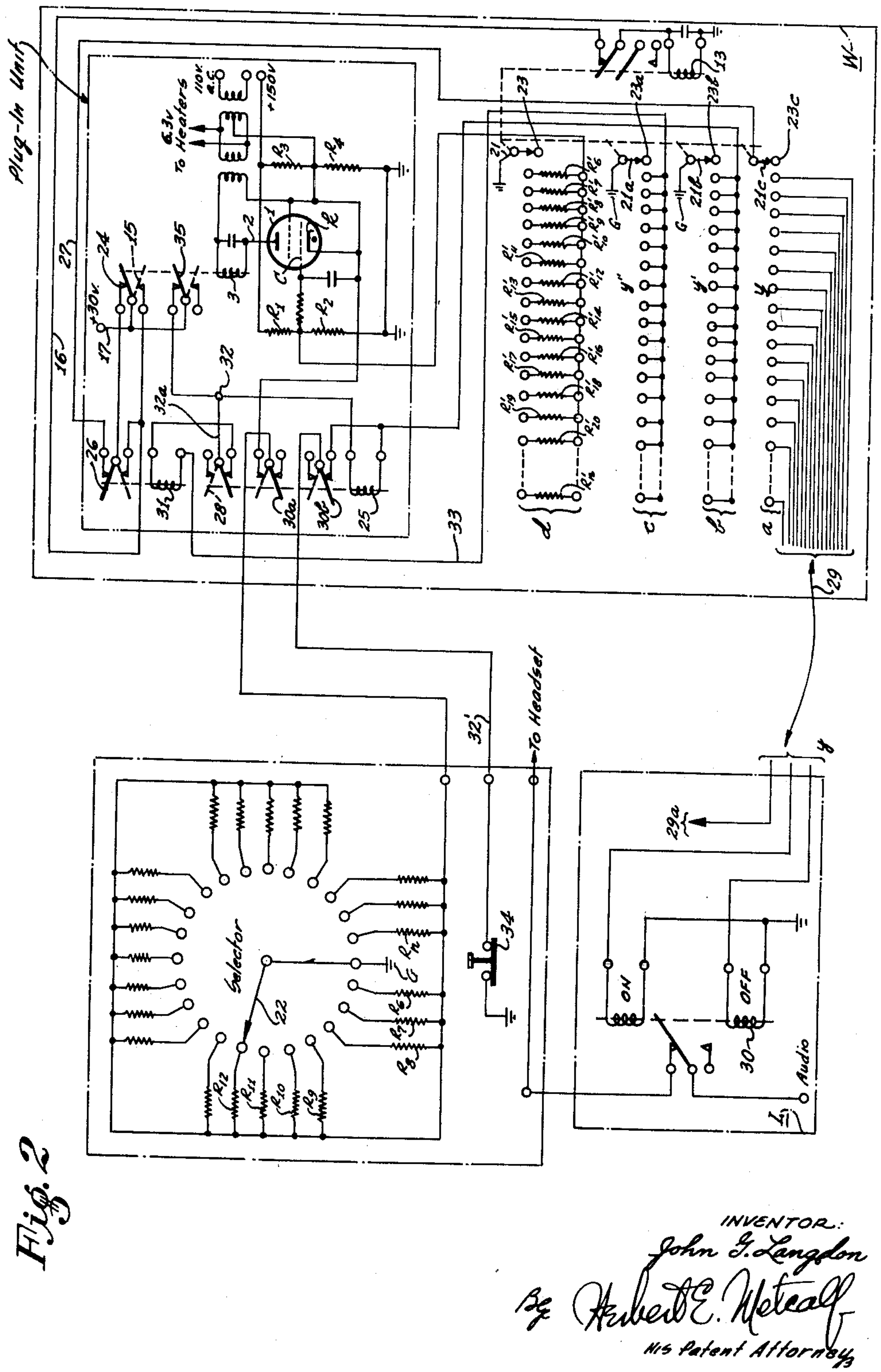
Figure 2 is a schematic diagram illustrating a typical application of the circuit shown in Figure 1, including automatic "homing" means.

In Figure 2 there is presented a schematic diagram of a cathode-controlled circuit, including automatic "homing" means. The control circuit, utilizing thyratron 1, is similar to that shown in Figure 1 with the exception that a positive voltage is applied to the voltage dividers $R_1$, $R_2$ and $R_3$, $R_4$, rather than a negative voltage and, furthermore, that actuation of selector arm 22 connects a resistor of certain magnitude (one of the resistors $R_6$ through $R_n$, for example) after operate pushbutton 34 is depressed to de-energize normally energized relay coil 25, from cathode *k* to ground G, thus reducing cathode potential and causing thyratron 1 to fire. Resulting current flow through lead 2 and relay coil 3, closes switch 15 which energizes stepping relay coil 13 with +30 volts D.C. via leads 17 and 16; consequently stepper arms 21, **21*a*, 21*b*, and 21*c*** of rotary stepping switch W are operated, connecting successive values of resistances i.e. resistors $R_6'$ through $R_n'$ from control grid *c* to ground G. Resistors $R_6'$ through $R_n'$ are of such magnitudes as to reduce the voltage of control grid *c* by equal increments. Ultimately when one of these resistors ($R_6'$ through $R_n'$) i.e. a resistor of magnitude sufficient to reduce voltage on control grid *c* to cut off value, is contacted, thyratron 1 is extinguished. Thus, as in the circuit disclosed in Figure 1, stepper arms 21, **21*a*, 21*b* and 21*c* stop in a unique position, dictated by a corresponding setting of selector arm 22. It is to be noted that auxiliary circuits are required in order to prepare the circuit for another selection i.e. return stepper arms 21, 21*a*, 21*b* and 21*c* to neutral contacts 23, 23*a*, 23*b* and 23*c***, respectively. The following discussion describes a preferred embodiment of such an auxiliary "homing" circuit.

When thyratron 1 ceases to conduct, relay coil 3 is deenergized owing to cessation of current flow therethrough. As a result, switch 15 engages contact 24 thus providing a conducting path for +30 volts D.C. via switch 26 and lead 27 to stepper arm **21*c*** on section *a* of rotary stepping switch W, at a certain contact position *y* and from thence via lead 29 to the "off" coil 30 of mixer-amplifier latching relay L and through to ground (—30 V.). Such an action can be utilized to disconnect an audio line from a headset, for example. It is to be noted that latching relay L is of such a nature that its contacts remain in the "off" position even after cessation of supply voltage to coil 30.

Simultaneous with the energization of the "off" coil 30 of latching relay L, +30 volts D.C. is also applied to relay coil 25 via lead 17, switch 35 and lead 32 and also to switch 28 via lead **32*a*. The circuit for relay coil 25** is completed to the contacts of section *b* of rotary stepping switch W and from a certain contact position *y'* to ground G via stepper arm **21*b*. Consequently relay coil 25** is energized; this action effects four results:

(1) Selector arm 22 is disconnected from cathode *k* because switch **30*a*** is now open. Thus the voltage on cathode *k* returns to a normal value and thyratron 1 will remain cut off until the next selection.

(2) Voltage (+30 volts D.C.) is applied to relay coil 31 via switches 35 and 28. The circuit for relay coil 31 is completed to ground via lead 33 and ground G of stepper arm **21*a*** at a certain position *y''* in section *c* of rotary stepping switch W. Thus relay coil 31 is energized.

(3) Stepper relay coil 13 is now energized by +30 volts from switch 24, switch 26 and lead 16. Coupled stepper arms 21, **21*a*, 21*b* and 21*c* consequently move from their attained position to neutral position 23. It will be understood that rotary stepping switch W proceeds in one direction through a complete cycle and then arrives at the original or "neutral" position 23** preparatory to recycling.

(4) When neutral position 23 is attained, the circuit energizing relay coil 31 is open, consequently stepper relay coil 13 is deenergized. Therefore stepping action ceases at the neutral position 23. It is to be noted that relay coil 25 remains energized via +30 v. lead 17, switch 35 and lead 32; the remainder of this circuit is completed to ground via holding contact **30*b*, lead 32' and operate pushbutton 34. Depression of operate pushbutton 34 de-energizes relay coil 25; consequently switch 30*a* opens and the cycle repeats, in accordance with setting of selector arm 22**.

It is to be noted that line **29*a*** represents a plurality of individual leads which connect to the "on" and "off" coils, respectively, of other latching relays L.

*Alternate embodiment*

There are numerous operations which involve the unique selection of one control proposition from a plurality of other control propositions. Bandswitching in a communications receiver and channel selection in a television receiver are two familiar examples. Figure 3 is a schematic diagram of a positive acting control circuit utilized in selecting a single remote control line or operation. For example, by means of this control circuit any one of ten audio lines may be monitored at a remote location, thus this embodiment differs from that shown in Figure 2 by means of which any combination of several control lines may be mentioned.

The distinguishing feature of the alternate embodiment of the invention as shown in Figure 3 is the use of add-subtract relay E, or bi-directional stepping motor, as it is known in the art. This relay E may be of any type where stepper arms 36 and 37 of switch sections 38 and 39, respectively, are connected to an armature (not shown) of relay coil 40 to be stepped in one direction thereby, and also connected to an armature (not shown) of relay coil 41 to be stepped in the opposite direction thereby. Such a bi-directional relay-operated stepper mechanism is well known and is shown for example, in the U.S. Patent to White, No. 2,706,259, issued April 12, 1955.

The principle of operation has been explained in conjunction with Figure 1. However, in order to clarify operation, approximate potentials effected by resistors $R_{11}$ through $R_{01}$ of section 38 and by resistors $R_{12}$ through $R_2$ of section 39 of stepping switch Z are shown at their respective contacts. Electron tubes $N_1$ and $N_2$ are thyratrons which will conduct with zero bias and will be cut off with —5 volts bias. Consequently when selector arm 32 and stepper arms 36 and 37 occupy the same relative positions ($P_5$ and $P_5'$, respectively, for example), electron tubes $N_1$ and $N_2$ are both cut off and, as a result, relay coils 40 and 41 are both de-energized. It is to be noted, however, that if the positions of selector arm 32 and of stepper arms 36 and 37 do not correspond, then either electron tube $N_1$ or electron tube $N_2$ will conduct and, as a result, either relay coil 40 or relay coil 41 will be energized, consequently moving stepper arms 36 and 37 in a direction necessary to restore equilibrium conditions. Circuit parameters are such that, when equilibrium occurs, the ultimate position of stepper arms 36 and 37 will correspond to the setting of selector arm 32. Thus this circuit is essentially a direction sensing combination of the fundamental circuit shown in Figure 1.

It is apparent to those skilled in the electronics art that this circuit could be modified in many ways and still accomplish the same result. For example, vacuum tubes might be used instead of thyratrons and the number of audio lines could be substantially increased or decreased. Therefore it is to be noted that various changes and modifications can be made in the remote control circuit herein disclosed without departing from the intended scope of the invention as defined in the appended claims.

What is claimed is:

1. A remote control circuit comprising: a first control tube having at least a plate, a control grid and a cathode; a second control tube having at least a plate, a control grid and a cathode; voltage divider means normally biasing both said control tubes to cut-off; a bi-directional stepping device having two stepping coils for driving said stepping device in opposite respective directions; a plurality of switch sections attached to said stepping device, each section having a plurality of fixed contacts and a stepping contact member operatively connected to be incrementally and simultaneously driven from one fixed contact to the next by said stepping coil; relay means in the plate circuit of each said control tube connected to energize a respective stepping coil when its associated control tube is conducting; a first plurality of resistors each connected at one end respectively to the fixed contacts of a first one of said switch sections, and the other ends of said resistors connected together; a second plurality of resistors each connected at one end respectively to the fixed contacts of a second one of said switch sections, and the other ends of said latter resistors connected together; the combination of said first section stepping contact member and resistors being connected at one end to the cathode of said first control tube and in shunt with a portion of said voltage divider means, for varying the potential of said cathode; the combination of said second section stepping contact member and resistors being connected at one end to the control grid of said second control tube and in shunt with another portion of said voltage divider means, for varying the potential of said grid; said first and second resistor pluralities having progressively graduated values such that when said first control tube conducts, said stepping device moves said stepping contact members in the direction to increase the potential of said first control tube cathode and said second control tube grid, and conversely to decrease the latter potentials when said second control tube conducts; a third switch section of said stepping device having contacts respectively adapted to select any of a number of output control functions, depending on the position of said stepping device; and a multiple-position incremental selecting device comprising a third plurality of resistors respectively connectable one at a time at one end to both the control grid of said first control tube and the cathode of said second control tube, to thus vary the grid-cathode potential of said control tubes in either direction and cause conduction of only one of said tubes, whereby said stepping device is moved in the corresponding direction to a desired rest position where counteracting grid-cathode potential changes will have been effected by said bi-directional stepping device, to bring the conducting tube to a cut-off condition again, said desired rest position of said stepping device corresponding to the selected position of said incremental selecting device.

2. Apparatus in accordance with claim 1 in which said control tubes are thyratrons, and including means for supplying an alternating plate-cathode voltage to each said thyratron for operation thereof.

3. In a remote control circuit: first and second control tube means each having a plate, a control grid and a cathode; bias means connected to said tube means and normally providing a rest position where both the tubes are biased to cut-off; multiple-position incremental control selecting means connected to said first tube control grid and to said second tube cathode, said first tube control grid being connected directly to said second tube cathode, to simultaneously change the potential thereof in either direction to thereby cause conduction of one or the other of said tube means; a bi-directional stepping device having opposite-direction driving means responsive respectively to conduction of said tube means so that said stepping device is actuated in one direction by conduction of one of said control tube means and in the opposite direction by conduction of the other tube means, and incremental potential-changing means connected to said first tube cathode and to said second tube control grid and driven by said stepping device in the proper direction to counteract the grid-cathode potential changes effected by said selecting means and thus return the conducting tube means to cut-off, whereby the position of said stepping device is remotely controlled by said incremental selecting means.

4. A remote control circuit comprising a thyratron control tube having a plate, a control grid, and a cathode, A.C. plate supply means operatively connected to said tube, a plate circuit relay with a coil connected in series with said plate and said supply means and having operating contacts, a first voltage divider and means connecting a point of said first voltage divider to said control grid, a control center having a plurality of control switches and control resistors paralleling a portion of said first voltage divider for changing the voltage on said control grid relative to said cathode in accordance with closure of any one of said control switches, a second voltage divider and means connecting a point of said second voltage divider to said cathode, a plurality of paralleling resistors connected at one end to said second voltage divider point and at the other end to a respective plurality of switch contacts, a stepper arm positioned to sequentially engage said switch contacts, said stepper arm electrically connected to another predetermined point in said second voltage divider, a stepping relay mechanically connected to drive said stepper arm and electrically connectable to an energizing voltage via said operating contacts of said plate circuit relay, said stepping relay, when energized by plate current flow, advancing said stepper arm in the direction to cause said second voltage divider to counteract the change in grid-cathode potential caused by closure of one of said control switches, the ultimate position of said stepper arm being where the grid-to-cathode voltage is insufficient to refire said thyratron on the positive excursions of said plate supply, and depending respectively on which one of said control switches is closed.

References Cited in the file of this patent

UNITED STATES PATENTS

| | | |
|---|---|---|
| Re. 22,794 | Deakin | Oct. 1, 1946 |
| 1,669,112 | Winter | May 8, 1928 |
| 2,049,615 | Levy et al. | Aug. 4, 1936 |
| 2,318,541 | Tewskbury | May 4, 1943 |
| 2,358,582 | Sziklai | Jan. 30, 1945 |
| 2,444,065 | Pouliart | June 29, 1948 |
| 2,584,153 | Oberman | Feb. 5, 1952 |
| 2,602,851 | Barton | July 8, 1952 |
| 2,633,557 | Cabes | Mar. 31, 1953 |
| 2,648,057 | Oberman | Aug. 4, 1953 |